United States Patent [19]
Berg et al.

[11] Patent Number: 4,754,942
[45] Date of Patent: Jul. 5, 1988

[54] SUPPORT FOR A CONTROL PANEL

[75] Inventors: Franco Berg, Isernhagen; Jürgen Zachroi, Dillenburg, both of Fed. Rep. of Germany

[73] Assignee: Rittal-Werk Rudolf Loh GmbH & Co. KG, Fed. Rep. of Germany

[21] Appl. No.: 30,944

[22] Filed: Mar. 26, 1987

[30] Foreign Application Priority Data

Mar. 26, 1986 [DE] Fed. Rep. of Germany ....... 3610151

[51] Int. Cl.⁴ ............................................... F16L 3/00
[52] U.S. Cl. ...................................... 248/121; 248/176
[58] Field of Search ...................... 248/121, 128, 145.6, 248/176, 676, 677, DIG. 7

[56] References Cited

U.S. PATENT DOCUMENTS

| | | | |
|---|---|---|---|
| 2,957,669 | 10/1960 | Berlin | 248/121 |
| 3,738,600 | 6/1973 | Harper | 248/121 |
| 4,559,747 | 12/1985 | Engel | 248/DIG. 7 X |

FOREIGN PATENT DOCUMENTS

7736386 11/1978 Fed. Rep. of Germany .

Primary Examiner—Ramon O. Ramirez
Attorney, Agent, or Firm—Thomas W. Speckman; Ann W. Speckman

[57] ABSTRACT

A support for a control panel or the like which is attached to a support plate at its lower end, and on its upper end supports a control panel or the like. A support is provided which may be installed permanently, or which is portable, and which facilitates feeding cables through the columnar profile section, to the control panel.

21 Claims, 3 Drawing Sheets

SUPPORT FOR A CONTROL PANEL

BACKGROUND OF THE INVENTION

1. Field of the Invention

The present invention relates to a support for a control panel or the like, which is constructed as a vertically-oriented columnar profile section; which is attached to a support plate at its lower end; and which supports a control panel or the like on its upper end.

2. Description of the Prior Art

Known supports of this type consist, as a rule, of a square tubular section, the lower end of which is connected to a base plate, and which is recessed in the area of the hollow space of the square tubular section for insertion of a feed cable to the control panel, or the like. The control panel or the like is thereby set up on the upper frontal side of the square tubular section to permit passing the feed cable from the square tubular section into the control panel or the like.

These known supports are solidly connected to the base plate in the area of the machine which is associated with it after the feed cables are inserted into the square tubular section. The insertion of feed cables is thus very difficult, since they must be inserted under the base plate and into the lower frontal side of the square tubular section. It is, furthermore, practically impossible to insert feed cables with a plug device attached to the end through the square tubular section and into the control panel or the like which is attached to the upper end of the square tubular section. The plug device must be previously detached and, after inserting the feed cable, must be again mounted in the control panel or the like. One further disadvantage of the known support is the fact that it cannot be transported easily to another location of use.

SUMMARY OF THE INVENTION

It is an object of the present invention to provide a support for a control panel or the like of the type previously described, which is suited for permanent, as well as portable installation, and in which the feed cable may be inserted quickly and easily with or without a plug unit.

This objective is, in accordance with the present invention, achieved as follows: the columnar support comprises a U-profile section with a central leg and two lateral legs; the columnar support is attached to the narrow side of a rectangular, cap-like support plate which is provided with a recessed mounting which is open to the outside; the open side of the U-profile section may be covered by means of a cover plate; the support plate is provided with attachment mounts for receiving screws, and the support plate supports at least one roller on each of the U-profile section; the rollers are aligned with the support surface of the support plate, protrude from the narrow side of the support plate, and are supported, in a rotatable manner, horizontally and in parallel to this narrow side; on the upper end of the U-profile section in the central leg an opening is provided, in which an annular plastic flange may be mounted in an insulating manner; the control panel or the like is attachable to the U-profile section in the area of the plastic flange; and the upper frontal side of the U-profile section may be sealed by means of a cap-like head piece which may be provided with a handle.

Utilizing this form of the support plate, the columnar support may be screwed to the support surface in the known manner. With a slight pivot movement of the U-profile section, the support may be rolled on the rollers, and may be guided by a carrying handle provided in the cap-like headpiece. The control panel or the like, mounted to the support, is always above the support plate and projects on one side of the U-profile section. This provides a secure support structure even without screw attachments. The cover plate is easily removable from the U-profile section, so that feed cables may be easily and quickly inserted, and may be inserted through the opening and the plastic flange provided in the support, and into the control panel or the like. A plug device attached to one end of the feed cable is thereby also not disturbed. The plastic flange may simultaneously insulate the opening in the U-profile section, so that the feed cable which is led through does not come into contact with the sharp edges of the opening. The support thus formed fulfills, in an optimal manner, all the requirements for both permanent and portable installation.

To attain an adequate attachment surface between the support plate and the U-profile section, one embodiment provides that the recessed mounting in the narrow side of the support plate is formed by enlarged walls which extend above the upper side of the support plate, which walls, by means of inclined wall section, merge into the upper surface of the support plate.

The connection between the support plate and the columnar support may be accomplished in a preferred manner when the U-profile section is attached to the central leg, and the lateral legs are attached to the enlarged wall parts of the support plate, preferably by screw attachment.

If, in accordance with another embodiment, the inner side of the central leg of the U-profile section is provided with alternating longitudinal grooves and longitudinal bars which are T-shaped in cross-section, then the feed cables can be additionally attached by means of known support devices to the inner side of the central leg of the U-profile section.

To provide easily-detachable attachment of the cover plate to the U-profile section, according to another embodiment the lateral legs of the U-profile section have, at least in the free end areas, a double-walled form and, on their frontal sides, form open plug slots into which mounting bars of the cover plate may be inserted and fastened.

Pulling the support when rolling the rollers on the floor is facilitated in an embodiment wherein the lower edge of the narrow side of the support plate and the U-profile section merge together over an inclined portion, and the rollers protrude slightly from this inclined portion of the support plate. Even a small degree of pivot movement of the U-profile section suffices to position the rollers on the ground, and to raise the support plate from the ground.

The rotational support of the rollers may be provided in a simple manner in an embodiment wherein the rollers may be supported in a rotatable manner on screws, which are mounted in vertical walls of the support plate.

The support plate, which is preferably constructed as a cast piece, may be produced with low weight and adquate solidity, and according to a preferred embodiment, the support plate may be reinforced inside its circular edge by means of longitudinally and laterally-directed corrugations.

The insulated mounting of the control panel or the like on the U-profile section may be achieved by providing a plastic flange inserted in the opening of the U-profile section and abutting the inner side of the central leg of the U-profile section, and attaching the control panel or the like, to the plastic flange by means of an annular clamping disk which is inserted into the opening, and between the rear wall of the control panel or the like and the central leg of the U-profile section, an additional plastic disk may be positioned. The insertion of the feed cable into the interior of the control panel or the like may be facilitated through the fact that the rear wall of the control panel or the like within the clamping disk is provided with an opening for inserting the feed lines, or supports a plug device for a complementary plug device attached to the feed cable.

The connection of a cap-like headpiece to the upper portion of the U-profile section, and the provision of the handle, are, in accordance with one simple embodiment, achieved as follows: the cap-like headpiece is insertable, by means of plug devices, into plug units provided on the U-profile section; the headpiece is formed like a cap, and corresponds in cross-sectional configuration to the cross-section of the U-profile section in combination with its cover plate; and a handle in the form of a longitudinal slot is provided in the wall of the headpiece in alignment with the cover plate.

BRIEF DESCRIPTION OF THE DRAWINGS

The invention is illustrated in greater detail with the aid of embodiments shown in the drawings in which.

DESCRIPTION OF PREFERRED EMBODIMENTS

Figure 1:
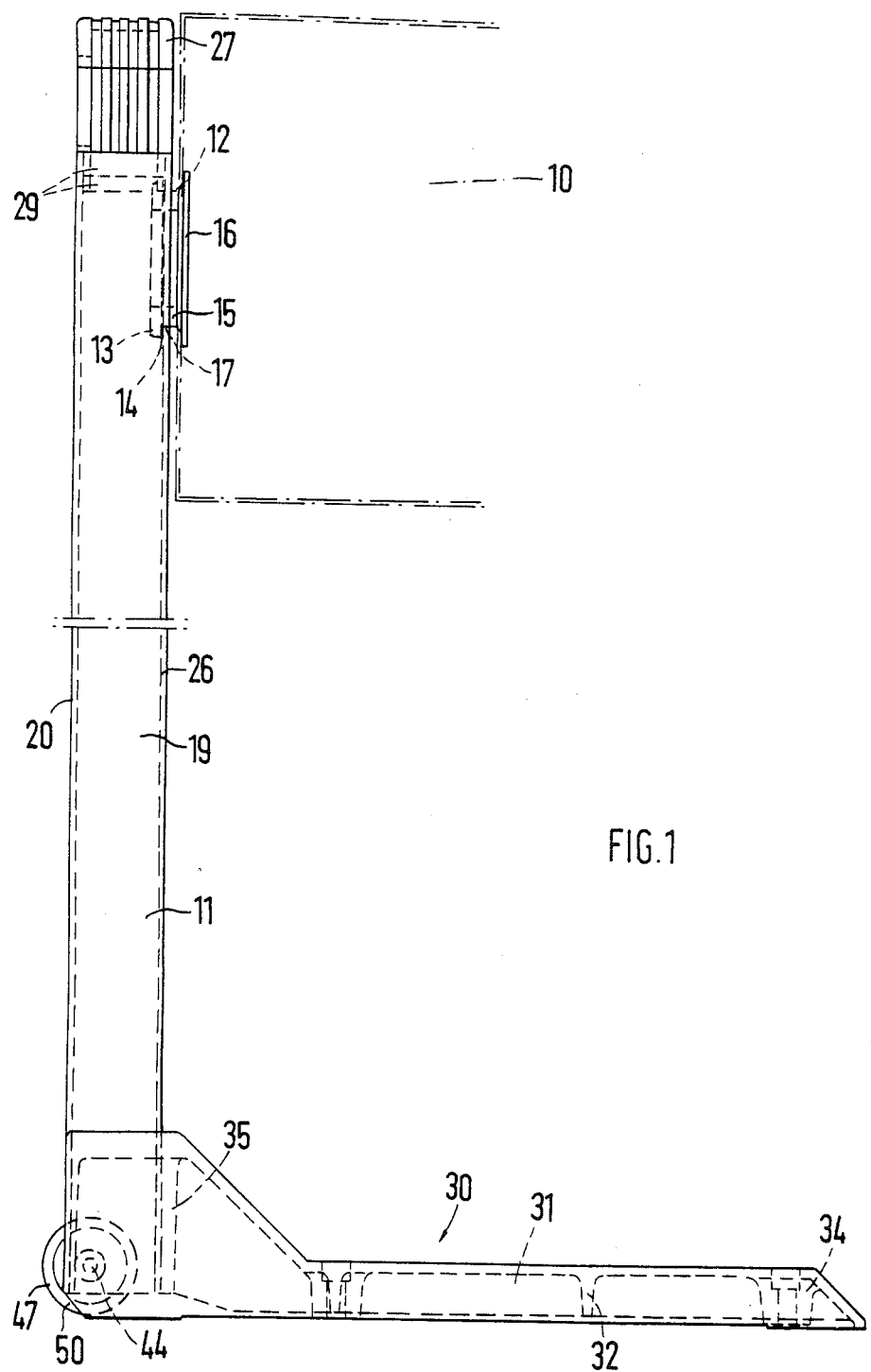
FIG. 1 shows a side view of the support, including the support plate, the U-profile section, and part of the control panel.
Figure 2:
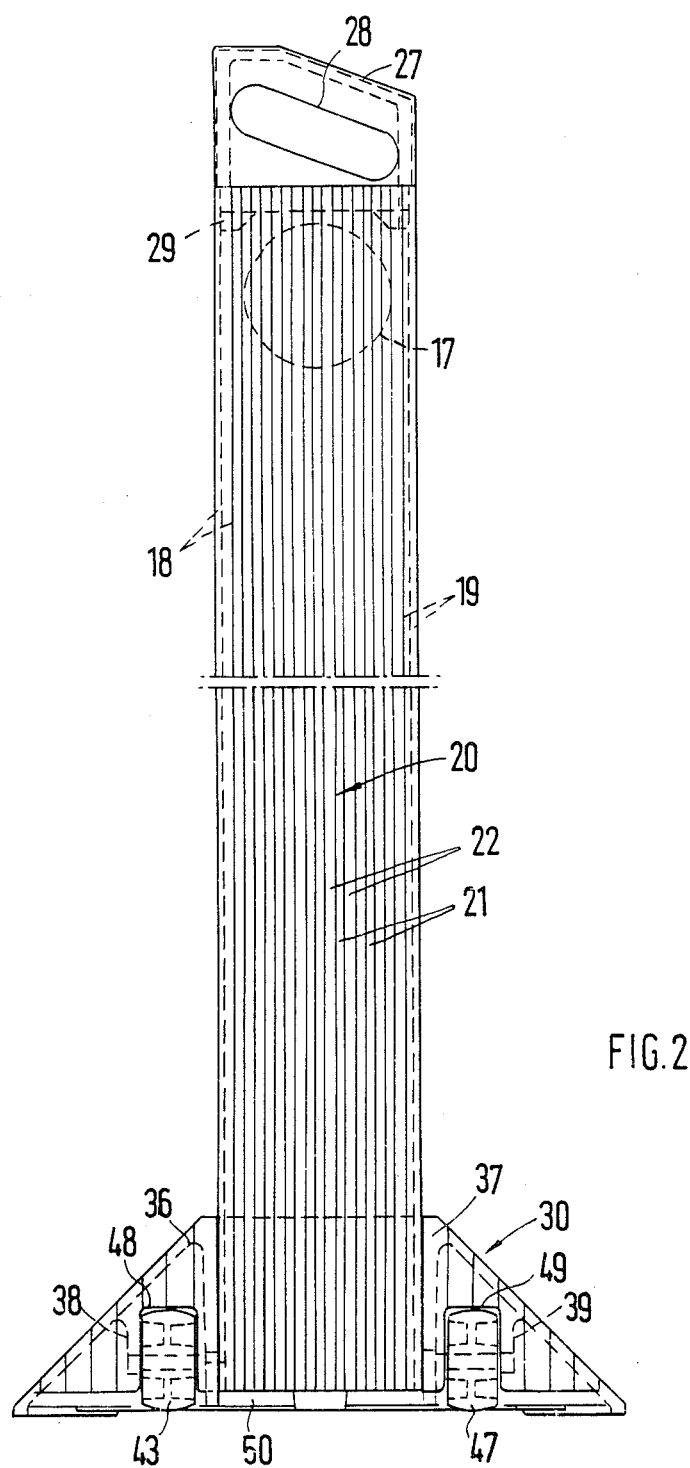
FIG. 2 shows a front view of the columnar support which is shaped as a U-profile section, provided with a cover plate, and mounted on the support plate.
Figure 3:
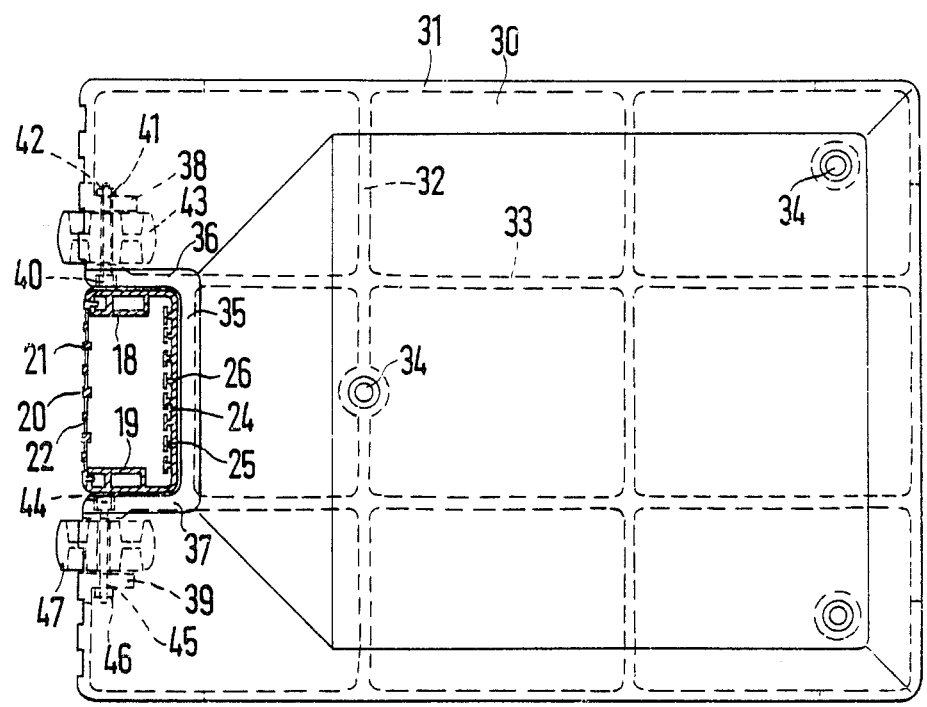
FIG. 3 shows a cross-sectional view through the columnar support, seen from above the support plate.

The vertical columnar support of the present invention comprises U-profile section (11), which may be closed by means of cover plate (20), as shown in the sectional view of FIG. 3. U-profile section (11) comprises central leg (26) and lateral legs (18 and 19). U-profile section (11) may be mounted in a recessed mounting formed at a narrow side of the rectangular support plate (30), and specifically in such a manner that the mounting is oriented outwardly. Support plate (30) provides a support surface and, inside circular edge (31), may be reinforced by means of laterally and longitudinally oriented corrugations (32 and 33).

To attach support plate (30) to the floor, or other support surface, attachment mounts (34) are shaped for receiving attachment screws provided with a head. In the area of the support plate with the recessed mounting for U-profile section (11), enlarged walls (35, 36, and 37) extend above the upper surface of support plate (30) to provide larger attachment and support surfaces. U-profile section (11) may be screw fastened to these enlarged walls (35, 36, and 37) which by means of inclined wall sections, merge into the upper surface of support plate (30).

In the area of the recessed mounting for fastening U-profile section (11) to support plate (30), chambers (48 and 49) are partitioned at both sides of the recessed mounting by vertical walls (36, 37, 38, and 39), and rollers (43 and 47) are supported in a rotatable manner in these chambers. Screws (40 and 44) are provide in vertical walls (36, 37, 38, and 39), and supported by means of support disks (41 and 45), as well as nuts (42 and 46). Screws (40 and 44) form horizontal rotational axes for rollers (43 and 47), which are oriented parallel to the narrow side of support plate (30). Rollers (43 and 47) protrude from the narrow side, and project from inclined wall (50), which merges the narrow side of the support plate into the support surface. With a slight pivot of U-profile section (11), rollers (43 and 47), which otherwise are aligned with the support surface of support plate (30), come into contact with the floor, and raise support plate (30) completely from the floor, so that the support can easily be moved over the floor as rollers (43 and 47) roll over the floor.

On the inner side of central leg (26) of U-profile section (11), longitudinal grooves (24) and longitudinal bars (25) which are T-shaped in cross-section may be provided, so that, with the aid of support means, the feed cables may be fastened to central leg (26) over the entire length of U-profile section (11). The length of U-profile section (11) is preferably adjustable to the usual working level of a standing or sitting individual. Lateral legs (18 and 19) of U-profile section (11) are preferably provided with double walls forming hollow recesses in at least their end areas. Near their terminal sides, lateral legs (18 and 19) are preferably provided with open plug slots, in which support means formed on cover plate (20) may be inserted and fastened. Cover plate (20) may thus be easily removed from U-profile section (11). When feed cables are fed through and fastened to U-profile section (11), and installed in control panel (10) or the like, then U-profile section (11) may be closed by cover plate (20). Cover plate (20) may have alternately thin and thick wall areas, as the reference numbers (21 and 22) show.

In the area of the upper end of central leg (26) of U-profile section (11), round opening (17) is provided, which opening is large enough to accommodate a plug device attached at the end of a feed cable. Annular plastic flange (13) may be mounted in opening (17) on the inner side of central leg (26), and this flange surrounds opening (17). Between plastic flange (13) and central leg (26), a first plastic disk (14) may be positioned. On the outer side of central leg (26), a second plastic disk (12) may be provided at opening (17). Clamping disk (16) is mounted on control panel (10) and may be provided with bores which align with threaded blind holes in plastic flange (13). Screws may be inserted into the bores in clamping disk (16), and screwed into the threaded blind holes of plastic flange (13) to affix the rear wall of control panel (10) or the like to annular plastic flange (13), which is thereby supported in opening (17) of central leg (26). Clamping disk (16) is annular and surrounds an opening in the rear wall of control panel (10) or the like. The feed cable may be inserted through this opening into control panel (10) or the like. In the area of this opening, complementary plug devices may also be positioned in control panel (10), so that the plug device which is attached to the end of the feed cable can be plugged into this complementary plug device through annular plastic flange (13).

The upper frontal side of the U-profile section (11) is preferably closed by means of cap-like headpiece (27). Headpiece (27) may be mounted on U-profile section (11) by means of plug units (29) and is preferably affixed to U-profile section (11). The lateral wall of headpiece (27) which aligns with cover plate (20), may be provided with a longitudinal slot as handle (28), by which the support may be pivoted to an inclined position for movement over the rollers (43 and 47) to another location for installation.

We claim:

1. A support for a control panel comprising a vertically directed columnar profile section attached at its lower end to a support plate and attached at its upper end to a panel, wherein said columnar profile section comprises a U-profile section (11) having a central leg (26) and two lateral legs (18, 19) extending therefrom; said support plate (30) has a recessed mounting on one side which is open toward the exterior, and said U-profile section (11) is attached to said support plate (30) at said recessed mounting; a cover plate (20) is attachable to said U-profile section (11) to enclose said U-profile section (11); said support plate (30) is provided with a plurality of attachment mounts (34) for retaining fasteners; said support plate (30) houses at least one roller mounted in a rotatable fashion (43, 47) on each side of said U-profile section, said rollers (43, 47) aligned with said support plate (30) and protruding from said one side of said support plate (30); an opening (17) is provided in an upper portion of said central leg (26) of said U-profile section (11), and an annular plastic flange (13) is mounted in said opening (17) in an insulating manner; said control panel (10) is fastened to said U-profile section (11) in the area of the said plastic flange (13); and said upper portion of said U-profile section (11) is enclosed by means of a cap-like headpiece (27) provided with a handle (28).

2. A support in accordance with claim 1, wherein said recessed mounting in said one side of said support plate (30) comprises enlarged walls (35, 36, 37) which extend above the upper surface of said support plate (30), and said enlarged walls (35, 36, 37) merge into the upper surface of said support plate (30) by means of inclined wall portions.

3. A support in accordance with claim 2, wherein said central leg (26) and said lateral legs (18, 19) of said U-profile section are fastened to said enlarged walls (35, 36, 37) of said support plate (30).

4. A support in accordance with claim 3, wherein an inner surface of said central leg (26) of said U-profile section (11) is provided with alternating longitudinal grooves (24) and longitudinal bars (25), which are generally T-shaped in cross-section.

5. A support in accordance with claim 4, wherein said lateral legs (18, 19) of said U-profile section (11) comprise double-walled sections, at least near their upper terminal ends to provide attachment plug units.

6. A support in accordance with claim 5 wherein said lateral legs (18, 19) of said U-profile section (11) comprise grooves near their terminal vertical surfaces for attachment of said cover plate (20).

7. A support in accordance with claim 6, wherein said U-profile section (11), merges with a lower support surface of said support plate (30) over an inclined wall (50) and said rollers (43, 47) protrude from the plane of said inclined wall (50).

8. A support in accordance with claim 7, wherein said rollers (43, 47) are supported in a rotatable manner on screws (40, 44) which are mounted in supporting vertical walls (36, 37, 38, 39) of said support plate (30).

9. A support in accordance with claim 8, wherein said support plate (30) has a circular edge (31), and is reinforced by longitudinally and laterally directed corrugations (32, 33).

10. A support in accordance with claim 9, wherein said annular plastic flange (13), abuts the inner side of said central leg (26) of said U-profile section (11), said control panel (10) is fastened to said U-profile section (11) by means of an annular clamping disk (16) fastened to said annular plastic flange (13), and an additional plastic disk (12) is provided at said opening (17) and between said control panel (10) and said central leg (26) of said U-profile section (11).

11. A support in accordance with claim 10, wherein said control panel (10) has an aperture corresponding to said opening (17) at said annular clamping disk (16) for introduction of feed cables.

12. A support in accordance with claim 11 wherein said control panel (10) is provided with a plug device in the area of said annular clamping disk (16).

13. A support in accordance with claim 11, wherein said cap-like headpiece (27) is mounted on the upper terminal end of said U-profile section (11), the cross-sectional configuration of said headpiece (27) corresponds generally to the cross section of said U-profile section (11) in combination with said cover plate (20), and said headpiece (27) has a longitudinal slot forming said handle (28) in its wall which is aligned with said cover plate (20).

14. A support in accordance with claim 1, wherein an inner surface of said central leg (26) of said U-profile section (11) is provided with alternating longitudinal grooves (24) and longitudinal bars (25), which are generally T-shaped in cross-section.

15. A support in accordance with claim 1, wherein said lateral legs (18, 19) of said U-profile section (11) comprise double-walled sections, at least near their upper and lower terminal ends to provide attachment plug units.

16. A support in accordance with claim 1, wherein said lateral legs (18, 19) of said U-profile section (11) comprise grooves near their terminal vertical surfaces for attachment of said cover plate (20).

17. A support in accordance with claim 1, wherein said U-profile section (11), merges with a lower support surface of said support plate (30) over an inclined wall (50) and said rollers (43, 47) protude from the plane of said inclined wall (50).

18. A support in accordance with claim 1, wherein said rollers (43, 47) are supported in a rotatable manner on screws (40, 44) which are mounted in supporting vertical walls (36, 37, 38, 39) of said support plate (30).

19. A support in accordance with claim 1, wherein said support plate (30) has a circular edge (31), and is reinforced by longitudinally and laterally directed corrugations (32, 33).

20. A support in accordance with claim 1, wherein said annular plastic flange (13) abuts the inner side of said central leg (26) of said U-profile section (11), said control panel (10) is fastened to said U-profile section (11) by means of an annular clamping disk (16) fastened to said annular plastic flange (13), and an additional plastic disk (12) is provided at said opening (17) and between said control panel (10) and said central leg (26) of said U-profile section (11).

21. A support in accordance with claim 1, wherein said cap-like headpiece (27) is mounted on the upper terminal end of said U-profile section (11), the cross-sectional configuration of said headpiece (27) corresponds to the cross section of said U-profile section (11) in combination with said cover plate (20), and said headpiece (27) has a longitudinal slot forming said handle (28) in its wall which is aligned with said cover plate (20).

* * * * *